(12) United States Patent
Smith et al.

(10) Patent No.: US 7,577,990 B2
(45) Date of Patent: Aug. 18, 2009

(54) METHOD AND SYSTEM FOR RESOLVING DISPUTES BETWEEN SERVICE PROVIDERS AND SERVICE CONSUMERS

(75) Inventors: Michael D. Smith, Kirkland, WA (US);
Miller T. Abel, Mercer Island, WA (US);
Max G. Morris, Seattle, WA (US); John A. Maffei, Medina, WA (US); Bruce E. Johnson, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 540 days.

(21) Appl. No.: 10/789,808

(22) Filed: Feb. 27, 2004

(65) Prior Publication Data

US 2005/0193112 A1 Sep. 1, 2005

(51) Int. Cl.
G06F 7/04 (2006.01)
G06F 12/00 (2006.01)
G06F 12/14 (2006.01)
G06F 13/00 (2006.01)
G06F 17/30 (2006.01)
G06K 19/00 (2006.01)
G11C 7/00 (2006.01)
H04L 9/32 (2006.01)

(52) U.S. Cl. ...................................................... 726/21
(58) Field of Classification Search .................. 705/1, 705/80; 726/21
See application file for complete search history.

(56) References Cited

U.S. PATENT DOCUMENTS

| 5,878,138 A | 3/1999 | Yacobi |
| 5,952,638 A | 9/1999 | Demers et al. |
| 5,953,420 A | 9/1999 | Matyas, Jr. et al. |
| 6,341,273 B1 * | 1/2002 | Briscoe ........................ 705/41 |
| 6,438,691 B1 | 8/2002 | Mao |

(Continued)

FOREIGN PATENT DOCUMENTS

EP 0 824 742 2/1998

(Continued)

OTHER PUBLICATIONS

"Server-Supported Signatures" N. Asokan, G. Tsudik, M. Waidner, Journal of Computer Security Fall 1997.*

(Continued)

*Primary Examiner*—Michael J Simitoski
*Assistant Examiner*—Harris C Wang
(74) *Attorney, Agent, or Firm*—Perkins Coie LLP

(57) ABSTRACT

A dispute resolution system for requesting a service provider to provide services so that the service provider can demonstrate to a service intermediary that a service consumer requested services. A service consumer that wants to start requesting services of the service provider registers with the service intermediary an end code of a sequence of code generated using a one-way function. The service intermediary provides the end code to the service provider. The service consumer can then using codes of the sequence requests the service provider to provide services. When the service provider receives a request, it verifies that the code of the request can be used to derive the end code. If the verification is successful, then the service provider can provide the verified code to the service intermediary as non-repudiatable evidence of the services requested by the service consumer.

15 Claims, 13 Drawing Sheets

U.S. PATENT DOCUMENTS

| | | | |
|---|---|---|---|
| 7,184,988 | B1 | 2/2007 | Frankel et al. |
| 7,363,500 | B2 | 4/2008 | Funk |
| 2001/0054026 | A1 | 12/2001 | Choate |
| 2003/0051169 | A1 | 3/2003 | Sprigg et al. |
| 2004/0015718 | A1 | 1/2004 | DeClouet |
| 2004/0205419 | A1 | 10/2004 | Liang et al. |

FOREIGN PATENT DOCUMENTS

| | | |
|---|---|---|
| WO | WO-99/63780 | 12/1999 |

OTHER PUBLICATIONS

U.S. Appl. No. 10/789,805, filed Feb. 27, 2004, Smith et al.
U.S. Appl. No. 10/789,392, filed Feb. 27, 2004, Smith et al.
U.S. Appl. No. 10/788,677, filed Feb. 27, 2004, Smith et al.
Peha, Jon et al. "Pay Cash: A Secure Efficient Internet Payment System," Proc. of the Fifth International Conference on Electronic Commerce, Oct. 2003, Pittsburgh, Pennsylvania (10 pages).
Yang, Beverly et al. PPay: Micropayments for Peer-to-Peer Systems, CCS '03, Oct. 27-30, 2003, Washington, DC (11 pages).
Zhou, Jianying et al., "Undeniable Billing in Mobile Communication," Proceedings of the 4th Annual ACM/IEEE International Conference on Mobile Computing and Networking, Oct. 1998 (7 pages).
Coffey, Tom et al., "Non-Repudiation with Mandatory Proof of Receipt," ACM SIGCOMM Computer Communication Review, vol. 26, Issue 1, Jan. 1996 (12 pages).
Tracz, Robert et al., "Fair Electronic Cash Withdrawal and Change Return for Wireless Networks," International Conference on Mobile Computing and Networking Proceedings of the 1st International Workshop on Mobile Commerce, Rome, Italy, 2001 (6 pages).
You, Cheng-Hwee et al., "On the Efficient Implementation of Fair Non-Repudiation," ACM SIGCOMM Computer Communication Review, vol. 28, Issue 5, Oct. 1998 (11 pages).
Skevington, P.J., et al., "Trusted Third Parties in Electronic Commerce," BT Technology Journal, vol. 15, Issue 2, Apr. 1997 (6 pages).
Louridas, Panagiotis, "Some Guidelines for Non-repudiation Protocols," ACM SIGCOMM Computer Communication Review, vol. 30, Issue 5, Oct. 2000 (12 pages).
Pfitzmann, Birgit, et al., "Strong Loss Tolerance of Electronic Coin Systems." ACM Transactions on Computer Systems (TOCS), vol. 15, Issue 2, May 1997 (22 pages).
European Search Report for European Patent Application No. 05100995.9, Jun. 2, 2005 (3 pages).
O'Mahony, et al., "Electronic Payment Systems for E-Commerce," Artech House Publishers, 2001.
Chen, Y., et al., "Online Checking Micro-Payment System in the Mobile Environment," Online!, Mar. 18, 2003.
European Search Report, Application 05100990.0-1245, Oct. 15, 2007.
Hauser et al., Micro-Payments on IKP, IBM, Research Report RZ 2791 (*89269) [online], Feb. 12, 1996. [retrieved on Oct. 22, 2006]. Retrieved from the Internet <http://citeseerx.ist.psu.edu/viewdocs/summary?doi-10.1.1.20.4434>.

\* cited by examiner

Application Name: App1

| Service | Cumulative Limit | Authorized Limit | Period |
|---|---|---|---|
| location | 500/mo | 50 | month |
| map | 10/day | 2 | day |
| quote | 0/day | 20 | day |
| score | 10/day | 10 | day |
| ⋮ | | | |

*FIG. 11*

METHOD AND SYSTEM FOR RESOLVING DISPUTES BETWEEN SERVICE PROVIDERS AND SERVICE CONSUMERS

TECHNICAL FIELD

The described technology relates generally to resolving disputes between service providers and service consumers based on non-repudiatable evidence provided by the service provider.

BACKGROUND

A wide variety of services are available from service providers through the Internet. For example, some service providers provide map information, weather information, stock information, and so on. Service consumers (e.g., personal computers) send requests for services to the web servers of the service providers. The web servers perform the service (e.g., retrieve the requested information) and provide the results of the service via web pages to the requesting service consumers. Many of these service providers provide their services at no charge to the service consumers. The service providers, however, typically obtain revenue by selling advertising space on the web pages that provide the information requested by the service consumers.

As computing devices become smaller and smaller, their screens for displaying information become smaller. For example, a cell phone is a computing device that may allow web access, but may only have a very small screen that cannot display a typical web page that includes advertisements. Thus, a service provider who provides services to cell phones may not be able to obtain revenue via advertising. It would be desirable to have a way in which service providers could obtain revenue for providing services to such computing devices.

Although these computing devices are becoming smaller, their processing power is increasing. As a result, these computing devices (e.g., cell phones and personal digital assistants) can host many different application programs. For example, a cell phone may host applications that provide electronic mail, map information, location information, calendaring information, and so on. These applications may come pre-installed when a computing device is purchased or may be installed by the user after purchase. For example, a cell phone user may want a map of their current location to be displayed on their cell phone screen. If a map application is not pre-installed, the cell phone user may download a map application from the Internet and install it on their cell phone. The map application may need to use the services of a location service provider and a map service provider. The map application may use the location service provider to identify the current location of the cell phone based on the readings from various cells near the cell phone and may provide that current location to the map service provider to obtain the appropriate map for display to the user.

Several difficulties may be encountered with the use of applications on such computing devices. One difficulty is that the advertising revenue model used by service providers may not work well with the use of such computing devices. One solution would be for a service provider to charge a fee for each requested service. For example, a location service provider may charge $0.02 for each requested location. It would be impractical, however, for the location service provider to charge a credit card for each requested service because the transaction costs of the charge would be too high. Although the location service provider could aggregate the charges for a service consumer and only charge the credit card once a month, there is no cost-effective way for the service consumer (or the user of the computing device) to dispute such a charge. For example, the aggregated charge may be $10, which would not nearly cover the transaction costs of the investigation by the credit card company that would be needed to resolve the dispute. It would be desirable to have a way to automatically resolve such disputes.

Even if the dispute resolution had no associated transaction costs, the aggregating of charges still presents disadvantages for the service provider. In particular, one disadvantage is that a service provider risks exposure to non-payment by the service consumer. Even though the service provider may have a credit card number of the service consumer, the charge may be declined, for example, because the cardholder has recently canceled the credit card. To limit such exposure to non-payment, a service provider may want to charge a credit card more frequently, but a disadvantage of such frequent charges is that each charge may have a minimum transaction cost that may be more than the amount being charged. It would be desirable to allow a service provider to specify an acceptable balance between exposure to non-payment and transaction costs of charging for services.

Another difficulty with the use of such computing devices is that an application that is downloaded and installed on a computing device may not behave correctly. For example, the application may contain a virus which requests location information every 10 seconds from a location service provider. Such requests may be not known to the service consumer until the credit card statement is received indicating that the location service provider charged the service consumer over $5,000 in service fees for that month. It would be desirable to have a way to automatically detect whether such an application is not behaving correctly. Moreover, it would be desirable for a service provider to indicate whether certain applications are not trustworthy based on a history of their behavior so that a service consumer can make a more informed decision about installing such an application.

In general, it would be desirable to have a cost-effective way for service providers to provide services and for service consumers using various applications in an environment where participants (i.e., service providers, service consumers, and applications and their authors) may be untrustworthy.

SUMMARY

A dispute resolution system provides a mechanism by which service providers can provide services to service consumers and have non-repudiatable evidence that services were requested. In one embodiment, a service consumer initially registers an end code of a sequence of codes with a service intermediary that is trusted by both the service consumer and the service provider. The sequence of codes is generated by successively applying a one-way function to the code generated by the previous application, starting with a start code and ending with the end code. The service intermediary provides the end code to the service provider. The service consumer then sends requests for services to the service provider that include a code in each request selected in reverse order of generation starting from the penultimate code. When the service provider receives a request, it can apply the one-way function to the code of the request to see if it can be used to derive the end code. If so, the service provider can provide that code to the service intermediary as non-

BRIEF DESCRIPTION OF THE DRAWINGS

FIG. 11 is a display description illustrating how a user of the service consumer can establish the authorized limits for applications in one embodiment.

DETAILED DESCRIPTION

Figure 1:
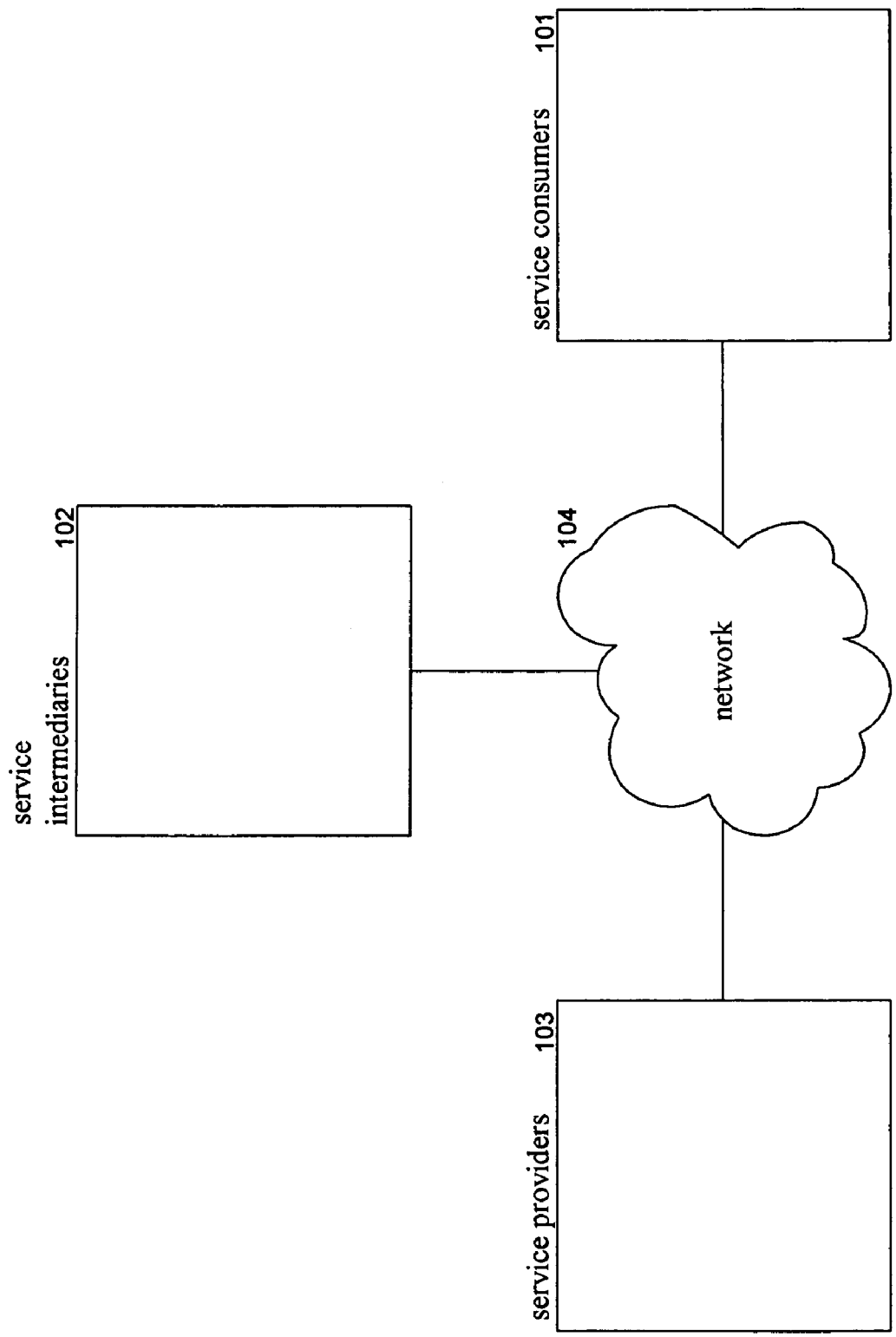
FIG. 1 is a block diagram illustrating components of the dispute resolution system in one embodiment.

A dispute resolution method and system for requesting a service provider to provide services so that the service provider can demonstrate to a service intermediary that it provided services requested by a service consumer is provided. In one embodiment, a service consumer that wants to start requesting services of the service provider registers an end code with the service intermediary. The end code represents the last code in a sequence of codes generated by applying a one-way function to a start code. (A one-way function is a function that is relatively easy to compute, but whose inverse is relatively hard to compute.) The application of the one-way function generates a sequence of codes starting with the start code and ending with the end code with some number of intermediate codes in between. Upon receiving the registration of the service consumer, the service intermediary provides the end code to the service provider. The service consumer can then start requesting the service provider to provide services. Each request that the service consumer sends to the service provider includes a code of the sequence in reverse order of generation. Because the function is one-way, it would be impractical for a service provider to apply an inverse function to generate codes closer to the start code than what has been received from the service consumer. Thus, if a service provider has a code of the sequence, it may be considered non-repudiatable evidence that it was received from the service consumer. Moreover, since the one-way function is relatively easy to compute, the service provider can easily verify whether a code received from a service consumer is a valid code of the sequence by applying the function to determine whether the end code can be correctly derived. Thus, when the service provider receives a request, it verifies that the code of the request can be used to derive the end code before providing the service. If the verification is successful, then the service provider provides the requested service to the service consumer. The service provider can use the verified code as non-repudiatable evidence that it provided all the services that the service consumer requested before that verified code was received. If the verification is not successful, the service provider can decline to provide the service because it does not have non-repudiatable evidence that the service consumer requested the service. If a service consumer is not provided with the requested service or is not satisfied with the provided service, then the service consumer need not request any more services of that service provider. In such case, the service provider will only have the codes (i.e., non-repudiatable evidence) for requests through the first request for which the service consumer was dissatisfied with the provided service. In this way, a service provider can ensure that it has non-repudiatable evidence, and service consumer can stop requesting services whenever it is dissatisfied with the provided service.

After receiving a code, the service provider can charge the service consumer for services provided. The charge may be submitted to a third-party financial entity such as a credit card service. If the service consumer disputes the charge, then either the service provider or service consumer is wrong. (Actually, both may be wrong in certain situations.) The dispute is resolved by the service intermediary, which may be affiliated with the financial entity. When the service intermediary receives an indication of the dispute, the service intermediary can request the service provider to provide a code that it received from the service consumer as non-repudiatable evidence that it provided the services as charged. When the service intermediary receives the code from the service provider, it can apply the one-way function starting at the received code to determine whether the end code provided by the service consumer at registration can be correctly derived. If the end code can be correctly derived and the number of applications of the one-way function is consistent with the charged services (e.g., each application, and thus each code, may correspond to one service), then the service intermediary declares the service provider as the winner of the dispute. The number of codes received by the service provider represents the number of services provided to the service consumer. So, if a service consumer is charged for 10 services, then the service provider needs to provide a code from which at least 9 codes need to be derived before deriving the end code. The service intermediary can verify the provided code by deriving codes starting with the start code and stopping with the provided code or by starting with the provided code and ending with the end code. In either case, the number of codes that are generated represents the number of services that the service provider can demonstrate it provided. If the provided code cannot be verified, then the service intermediary may declare the service consumer as the winner. Thus, the service intermediary can resolve disputes automatically and at a low cost (i.e., without any human intervention).

In one embodiment, the service intermediary first attempts to resolve the dispute using methods other than applying the one-way function. The application of the one-way function, although relatively easy to compute when compared to its inverse, may be more computationally expensive than is practical for frequent application. For example, a service intermediary may resolve thousands of disputes per day. The service intermediary may attempt to resolve a dispute initially by asking both the service provider and the service consumer to provide codes corresponding to the charged services. If the codes are the same, then the service intermediary declares the service provider as the winner because it provided the code that the service consumer agrees is the correct non-repudiatable evidence. If the codes, however, are not the same, then either the service provider or the service consumer is wrong (or both may be wrong). In such a case, the service intermediary applies the one-way function to determine whether the code provided by the service provider or service consumer is correct. The service intermediary declares whoever provided the correct code as the winner. If neither the service provider nor the service consumer provided the correct code, then the service intermediary declares that dispute cannot be resolved since both are providing incorrect information. Alternatively, the service intermediary could declare the service consumer as the winner since the service provider could not provide the evidence to support its charge.

As further evidence to be used when resolving a dispute, the service provider can provide its own codes to the service consumer when it provides requested services. The service provider may generate its own sequence of codes and register it with the service intermediary. The service intermediary can provide the end code to the service consumer. The service provider can then provide those codes in reverse order of generation to the service consumer in its response to each service request. When resolving a dispute, the service intermediary may ask the service provider and service consumer to provide the corresponding codes that were generated by both the service provider and the service consumer. The service intermediary can verify the codes in much the same way as the codes of the service consumer are verified. If the service provider provided the correct service consumer code and the correct service provider code, then the service intermediary declares the service provider as the winner. If the service provider provided an incorrect service consumer code and the service consumer provides both codes correctly, then the service intermediary declares the service consumer as the winner. Otherwise, the service intermediary may declare that the dispute cannot be resolved because both parties provided evidence that turned out to be incorrect. The use of the codes generated by the service provider provides another level of verifying that the resolution of the dispute is consistent with the evidence.

One skilled in the art will appreciate that many variations of this dispute resolution system are possible. For example, the service intermediary may generate the codes for the service consumer and provide them to the service consumer, and generate the codes for the service provider and provide them to the service provider. Alternatively, the service intermediary may select the start codes and provide them to the service consumers and the service providers during the registration process for use in generating their own sequences. If the service consumer generates the sequence of codes, it can provide the start code, end code, or both to the service intermediary during registration. If the service intermediary is provided only with the start code, it can apply the one-way function a specified number of times to derive the end code that it can then provide to service provider. If the service intermediary is provided with the end code, it can provide the end code directly to the service provider. When the service provider provides the non-repudiatable evidence, the service intermediary can apply the one-way function to see if the end code can be derived. An analogous process can occur when the service provider generates its own codes.

One skilled in the art will also appreciate that the timing of the sending of codes from a service consumer to a service provider can be varied. For example, a service consumer might only provide a code after a service provider provides the requested service. The code may be provided in the next service request or right after the service is provided. If the service provider does not receive the code or cannot verify the correctness of the code, it can decline to provide any more services to the service consumer. When the code is sent before the requested service is provided, the service consumer assumes the risk that the service provider will not provide the service. In contrast, when the code is sent after the requested service is provided, the service provider assumes the risk that the service consumer will not send the code. One skilled in the art will appreciate that when a service provider receives a code that it can verify, it can use that code to demonstrate that the service consumer requested a service.

The length of the sequence or number of codes in the sequence represents the number of services that can be requested based on one registration. For example, if there are 101 codes in the sequence, then 100 services can be requested. The end code is not used to request a service because it is provided directly from the service intermediary to the service provider. In one embodiment, the number of codes in the sequence represents a "billing unit." A billing unit represents the minimum number of services for which a service provider can charge in a single charge transaction. When a service provider receives the start code from the service consumer, it can then charge the service consumer for all the services of that billing unit. A service provider to balance its exposure to non-payment liability and the charge transaction costs can specify the number of codes in a billing unit. A service provider may want to reduce its charge transaction costs by requesting payment for only a large number of services at a time. The larger the number of services in a request, the fewer the number of requests that need to be made and the smaller the charge transaction costs per provided service. However, the larger the number of services covered by each charge, the larger is the exposure of the service provider to non-payment by the service consumer. For example, if the number of services in a billing unit is 1,000, then the service provider risks exposure to non-payment of 1,000 services if the service consumer is unable to pay (e.g., has gone bankrupt). However, the risk of non-payment may be outweighed by the potential savings in charge transaction costs by having a large number of service requests per billing unit.

In one embodiment, a service consumer can detect whether an application that it is running is behaving incorrectly. For example, the application may attempt to request more services than it is authorized to request. When the service consumer detects such incorrect behavior, the service consumer can automatically uninstall the application and notify the service provider. The service provider can analyze notifications provided by various service consumers to determine whether the application is indeed behaving incorrectly. If so, then the service provider can ensure that the application is not authorized to use the service provider. When another service consumer attempts to install that application, the service consumer may check with the service provider to see if that application is authorized. If not, the service consumer can abort installation of the application. If a service provider, in contrast, detects that a service consumer is providing notifications that many applications are behaving incorrectly but no other service consumer is providing such notifications, then the service provider may deduce that the service consumer, rather than the applications, is behaving incorrectly. In such case, the service provider may revoke the authorization of the service consumer to use the service provider. In this way, the service provider can aggregate information about applications to determine which applications or service consumers are behaving incorrectly.

FIG. 1 is a block diagram illustrating components of the dispute resolution system in one embodiment. The service consumers 101, the service intermediaries 102, and the service providers 103 are connected to the network 104. The service intermediary may use any of a variety of well-known authentication techniques to ensure that communications purporting to be coming from the service consumer and service provider are really coming from them and not from an imposter. The service consumers may include any type of computing device such as a personal digital assistant, a cell phone, a global positioning system device, personal computer, and so on. The service providers can provide a wide variety of services to the service consumers. For example, if a service consumer is a cell phone, then a service provider may provide a location service that provides the current location.

The computer systems of the service consumer, service provider, and service intermediary may include a central processing unit, memory, input devices (e.g., keyboard and pointing devices), output devices (e.g., display devices), and storage devices (e.g., disk drives). The memory and storage devices are computer-readable media that may contain instructions that implement the generation system. In addition, the data structures and message structures may be stored or transmitted via a data transmission medium, such as a signal on a communications link. Various communications links may be used, such as the Internet, a local area network, a wide area network, or a point-to-point dial-up connection.

FIG. 1 illustrates an example of a suitable operating environment in which the dispute resolution system may be implemented. The operating environment is only one example of a suitable operating environment and is not intended to suggest any limitation as to the scope of use or functionality of the dispute resolution system. Other well-known computing systems, environments, and configurations that may be suitable for use include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The dispute resolution system may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Figure 2:
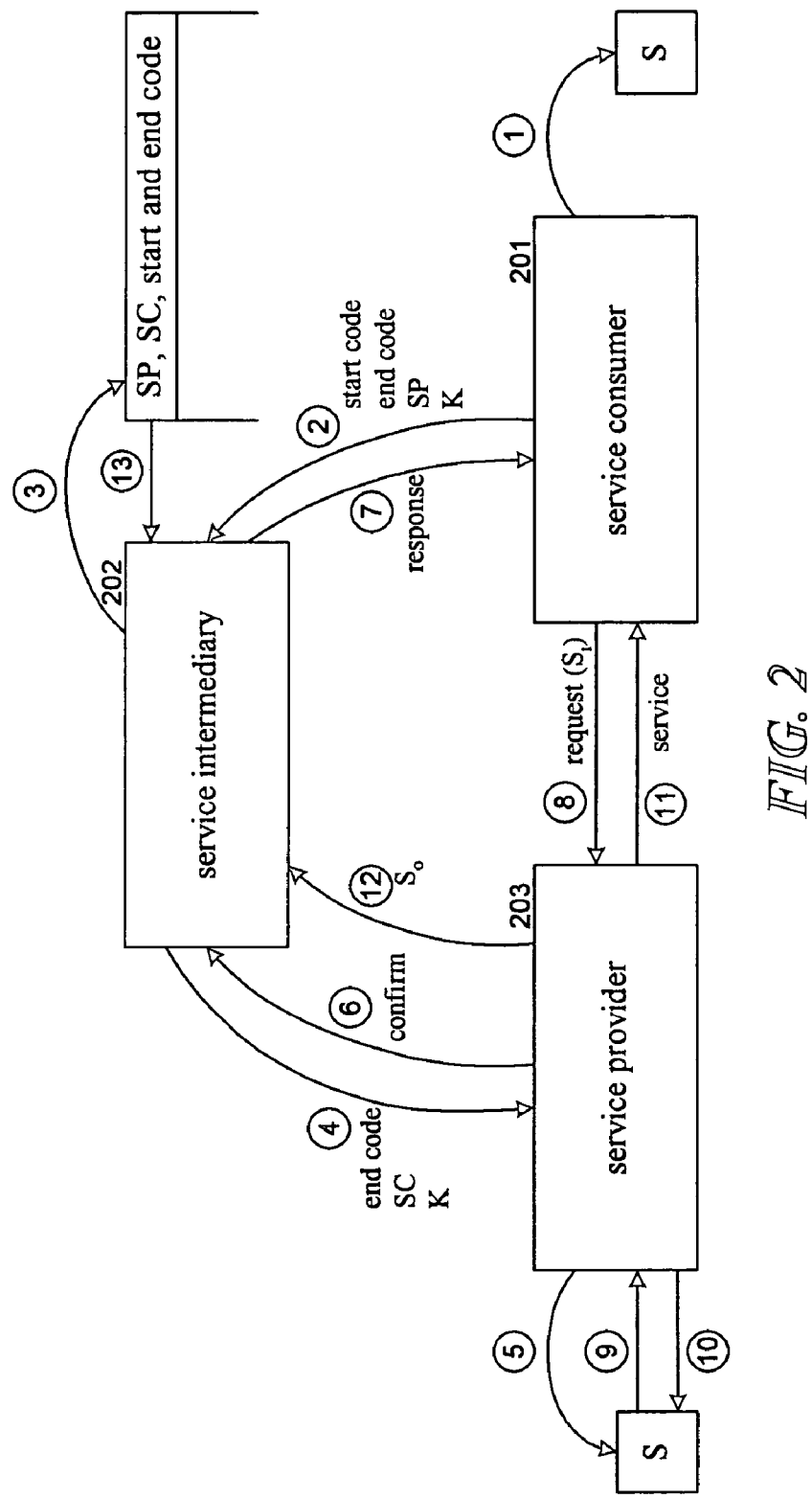
FIG. 2 is a diagram illustrating an example flow of information between a service consumer, a service intermediary, and a service provider in one embodiment.

FIG. 2 is a diagram illustrating an example flow of information between a service consumer, a service intermediary, and a service provider in one embodiment. In this example, the service provider 203 does not provide its own sequence of codes. When the service consumer 201 wants to request services of a service provider, it selects a start code and generates and stores 1 a sequence of codes derived from that start code. In one embodiment, the number of codes in the sequence may be predefined, for example, in a contract between the service provider and the service consumer that is registered with the service intermediary 202. The service consumer then sends 2 a registration request to the service intermediary. The registration request may include the start code, end code, identity of the service provider, and identity of the contract under which the services are to be provided. The service intermediary may validate the request (e.g., ensure that the service provider and contract are valid) and stores 3 a registration record for the service consumer. The service intermediary may assign a unique registration number to each registration so that disputed charges can be tracked to the corresponding registration. The service intermediary then sends 4 a notification of the registration to the service provider. The notification may include the end code and the identity of the service consumer and the contract. The service provider may validate the notification and store 5 the information of the notification for use in verifying service requests. The service provider then responds 6 to the service intermediary confirming that it has accepted the notification of the registration. The service intermediary in turn responds 7 to the service consumer indicating that registration has been accepted. The service consumer then sends 8 a request to the service provider. Each request includes a code of the sequence. Upon receiving a request, the service provider retrieves 9 the last code that was previously received from the service consumer—initially retrieving the end code provided by the service intermediary. The service provider applies the one-way function to the received code to determine whether it matches the retrieved code. If so, then the received code is verified as being correct and the service provider stores 10 the received code and provides the service. The service provider may send 11 the results of the performing the service to the service consumer. Alternatively, the service consumer may verify that the service provider performed the service in some other way. For example, if the service request was to send an authorization to a vending machine to dispense a product, then the user can visually confirm whether the service was provided. Steps 8-11 are repeated for each service that the service consumer requests, up to the predefined length of the sequence. Upon completion of all the services in the sequence, the service provider can charge the service consumer. The charge may include the unique identification of the registration. If the service consumer disputes the charge, the service provider can use the start code provided by the service consumer as non-repudiatable evidence that it provided the services. The service provider can provide the start code to the service intermediary as evidence. The service intermediary can compare it to the start code provided by the service consumer at registration to determine whether the service provider wins the dispute.

Figure 3:
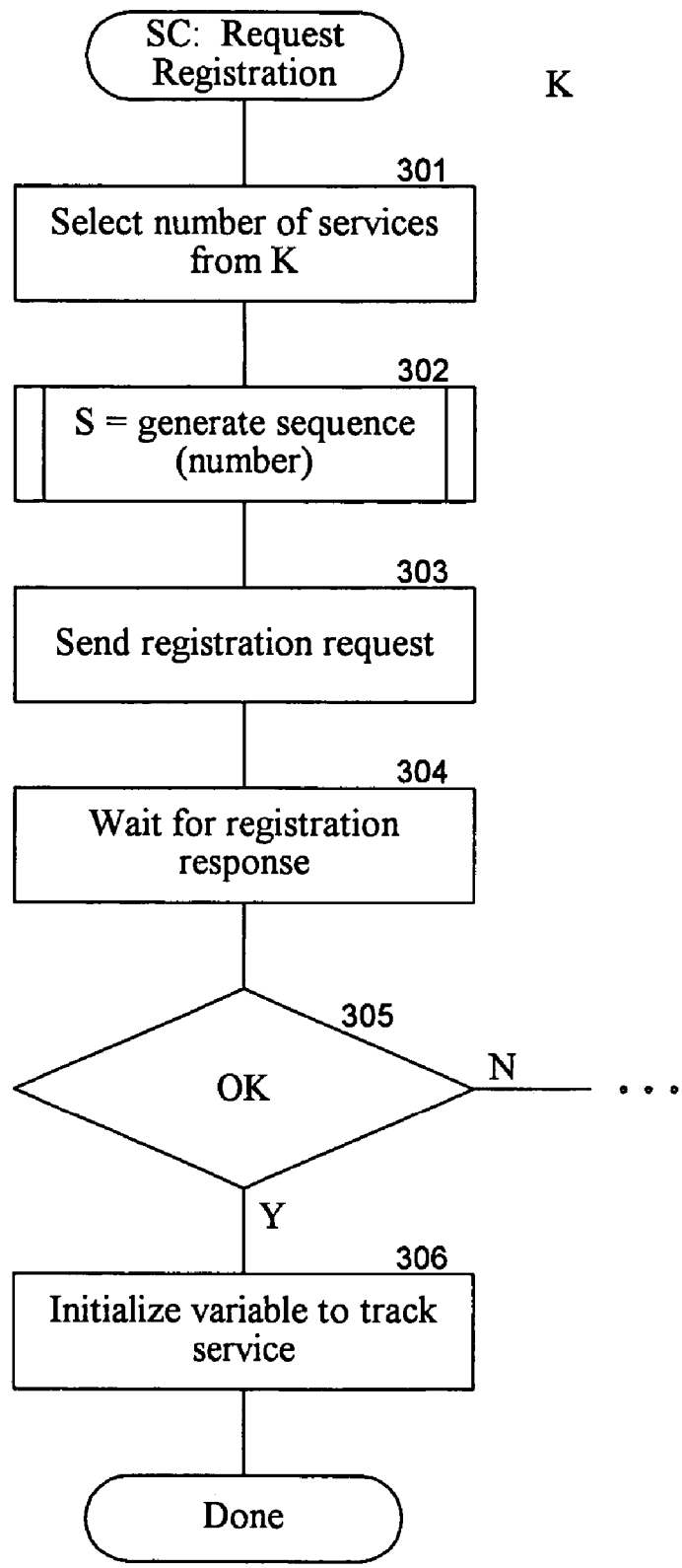
FIG. 3 is a flow diagram illustrating the processing of a component of a service consumer that registers a sequence of codes in one embodiment.

FIGS. 3-9 are flow diagrams illustrating processing performed by the service consumer, the service intermediary, and the service provider of the dispute resolution system. In the illustrated processing, the service provider does not generate its own sequence of codes. FIG. 3 is a flow diagram illustrating the processing of a component of a service consumer that registers a sequence of codes in one embodiment. The component may be invoked passing an indication of the service provider and the contract under which the services are to be requested. If there is only one contract between the service consumer and service provider, then it need not be identified. Also, the contract may be implied by the service intermediary or service provider. In block 301, the component selects the number of services to be requested based on the contract. In block 302, the component invokes a function to generate the sequence of codes for the selected number of services. In block 303, the component sends a registration request message to the service intermediary. The registration request message may include the start code, the end code, and the identification of the service provider and contract. In block 304, the component waits for the response from the service intermediary. In decision block 305, if the response indicates that the registration has been accepted, then the component continues at block 306, else the mode continues by processing the rejected registration. In block 306, the component initializes a variable to track the number of services that have been provided. The component then completes.

Figure 4:
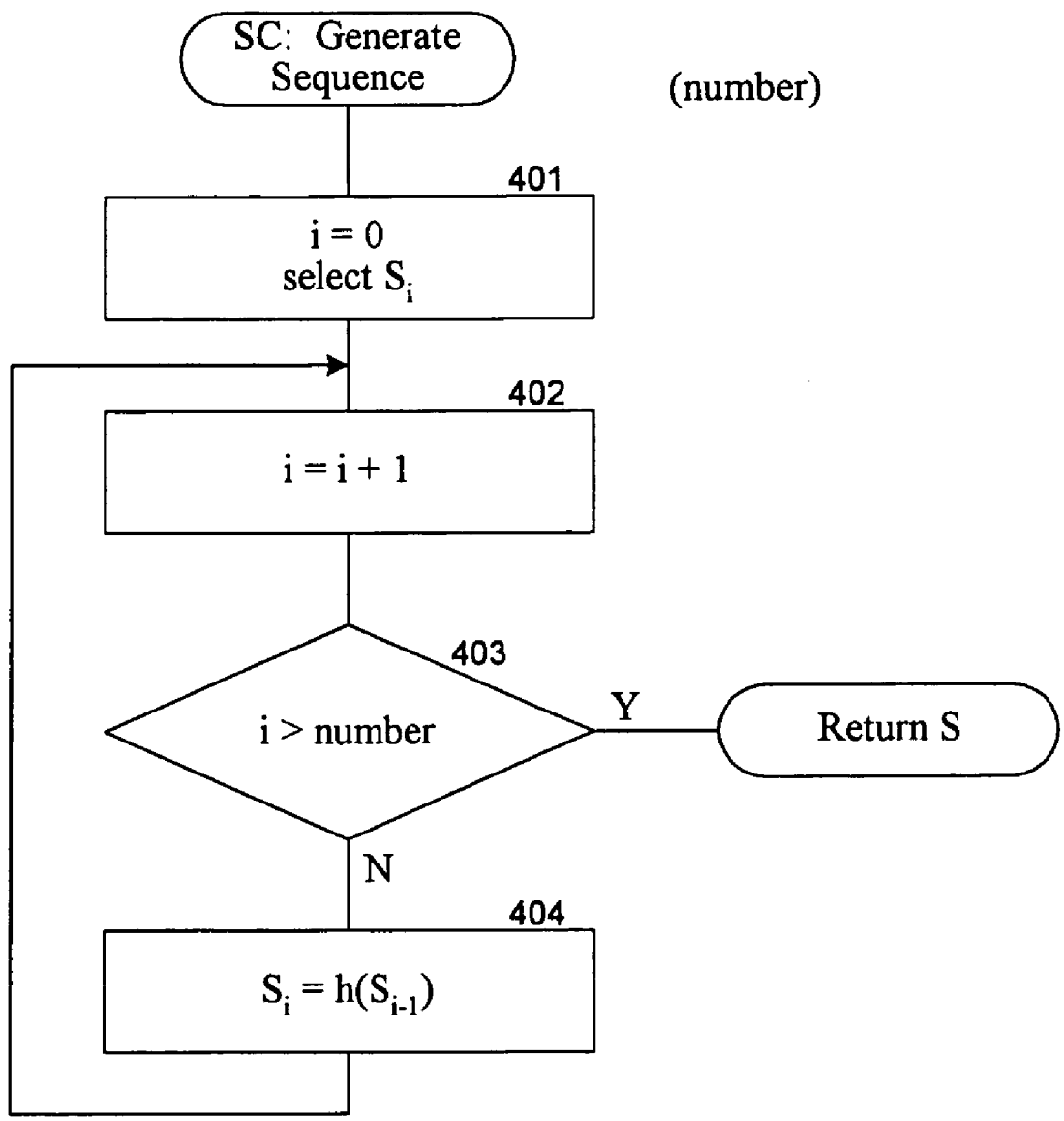
FIG. 4 is a flow diagram illustrating the processing of the component that generates a sequence in one embodiment.

FIG. 4 is a flow diagram illustrating the processing of the component that generates a sequence in one embodiment. The component is passed the number of services to be represented by the sequence. In block 401, the component sets an index i to identify the first code in the sequence, which is the start code, and sets the start code. The start code may be selected by a random number generator. The sequence is stored in the array S. In blocks 402-404, the component loops applying the one-way function to generate the sequence of codes. In block 402, the component increments the index to point to the next code in the sequence. In decision block 403, if the index is greater than the number of services of the sequence, then the component returns the sequence, else the component continues at block 404. In block 404, the component stores the code, generated by applying the one-way function to the previous code in the sequence, at the indexed position within the sequence. The component then loops to block 402 to generate the next code in the sequence.

Figure 5:
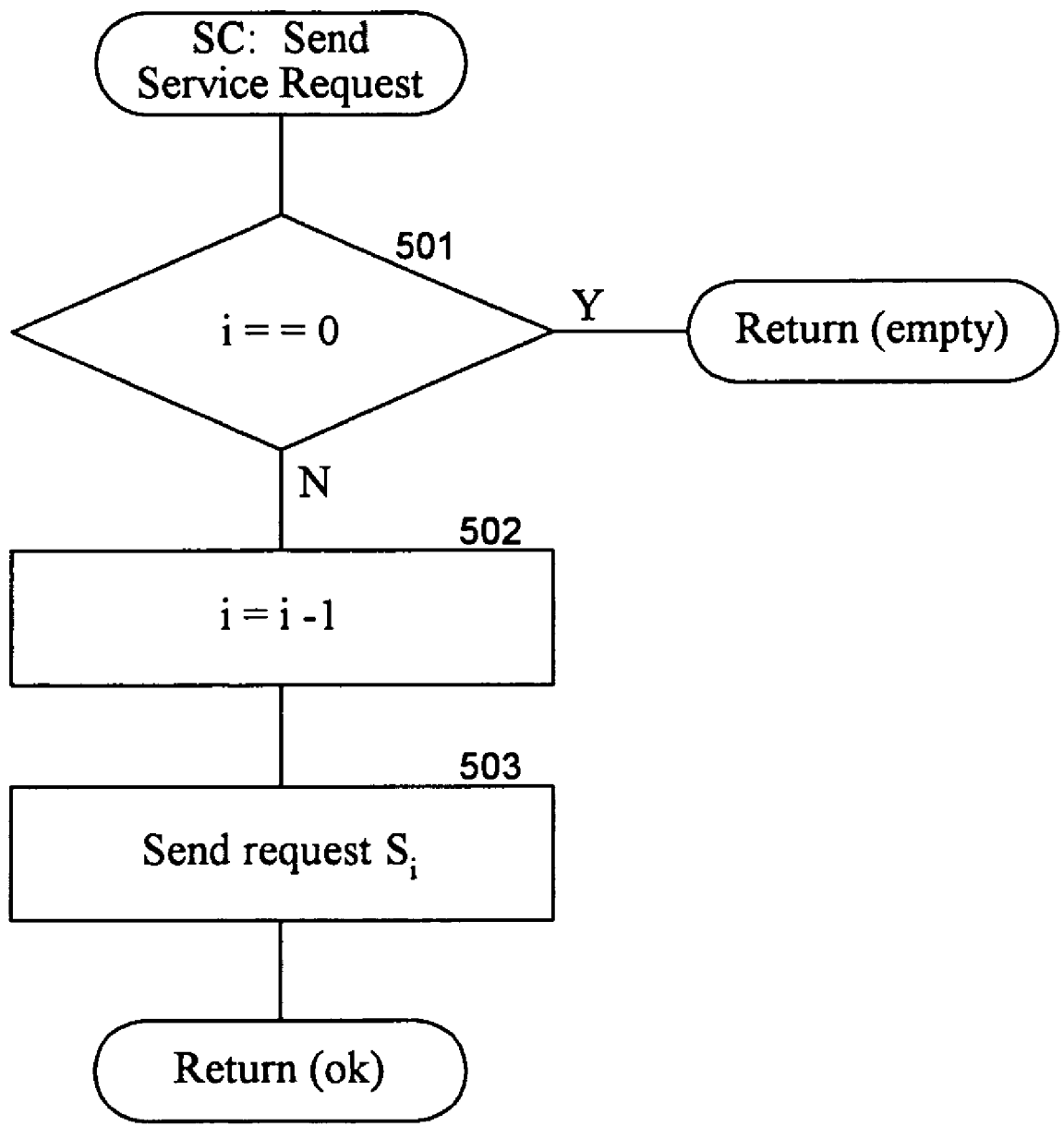
FIG. 5 is a flow diagram illustrating the processing of the component that requests a service from the service provider in one embodiment.

FIG. 5 is a flow diagram illustrating the processing of the component that requests a service from the service provider in one embodiment. In decision block 501, if the number of services in the sequence have already been requested, then the component returns an indication that the service cannot be requested, else the component continues at block 502. In block 502, the component decrements a variable that is used to track the number of services that have been requested and that represents the number of services that can be requested. In block 503, the component sends a service request message to the service provider that includes the indexed code of the sequence and then returns an indication that the request has been sent.

Figure 6:
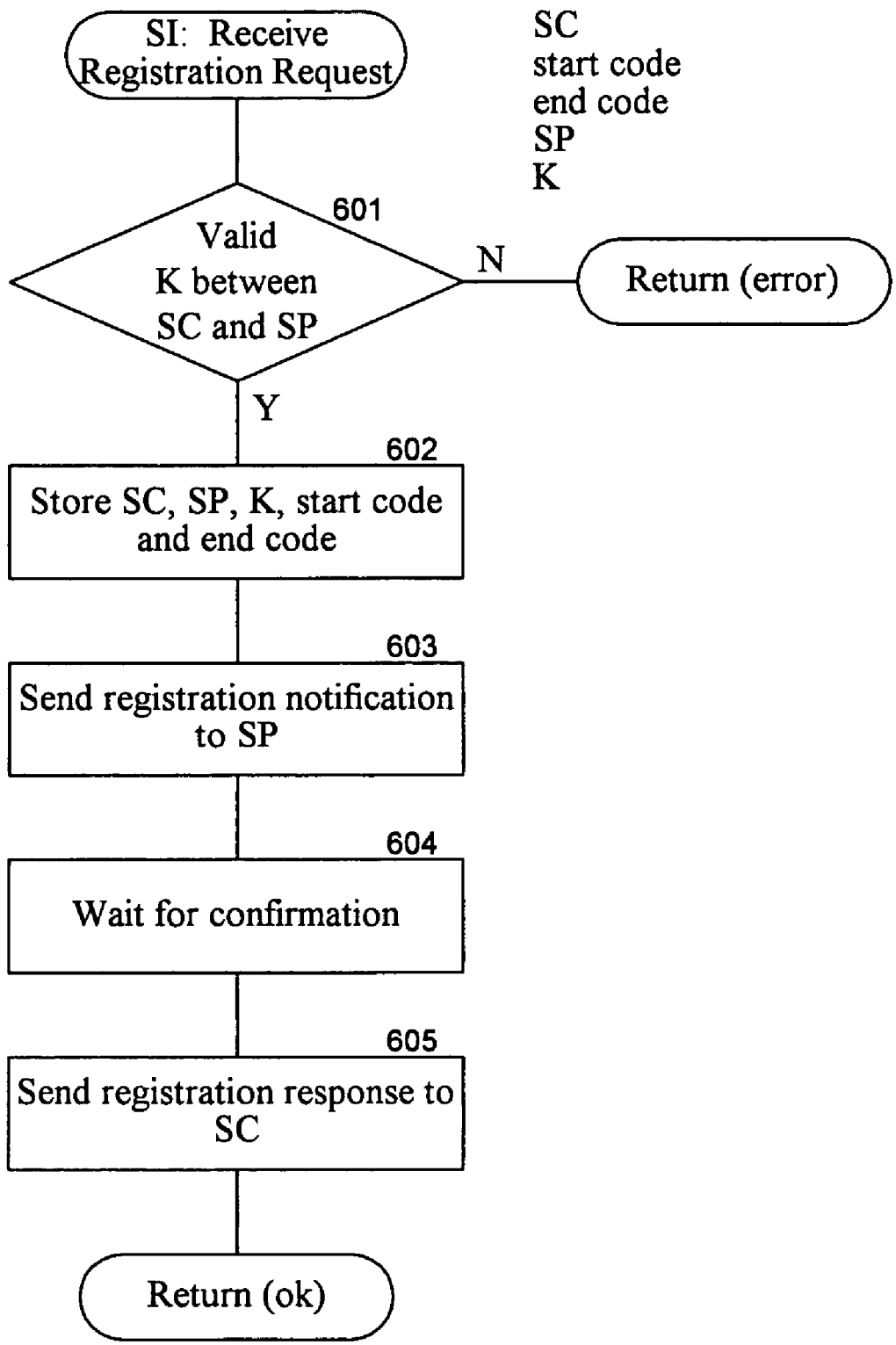
FIG. 6 is a flow diagram illustrating the processing of a component of a service intermediary that is invoked when it receives a registration request message from a service consumer in one embodiment.

FIG. 6 is a flow diagram illustrating the processing of a component of a service intermediary that is invoked when it receives a registration request message from a service consumer in one embodiment. The component is passed an indication of the service consumer, the start and end codes, the service provider, and the contract. In decision block 601, if the contract represents a valid contract between the service consumer and the service provider, then the component continues at block 602, else the component returns an error and may notify the service consumer that the registration has been rejected. In one embodiment, service consumers and service providers may register their contracts with the service intermediary. The contract may identify the number of services to be included in the sequence and pricing information such as the amount the service provider will charge for each provided service. The service intermediary uses the registered contract information when resolving disputes. In block 602, the component stores the passed information so that it can be used when a dispute needs to be resolved. In block 603, the component sends a registration notification message to the service provider. The message identifies the service consumer, the contract, and the end code. In block 604, the component waits for a confirm registration message from the service provider. When the confirm response is received, the component sends in block 605 a registration response message to the service consumer indicating that the registration has been accepted. The component then returns an indication that the registration was successful.

Figure 7:
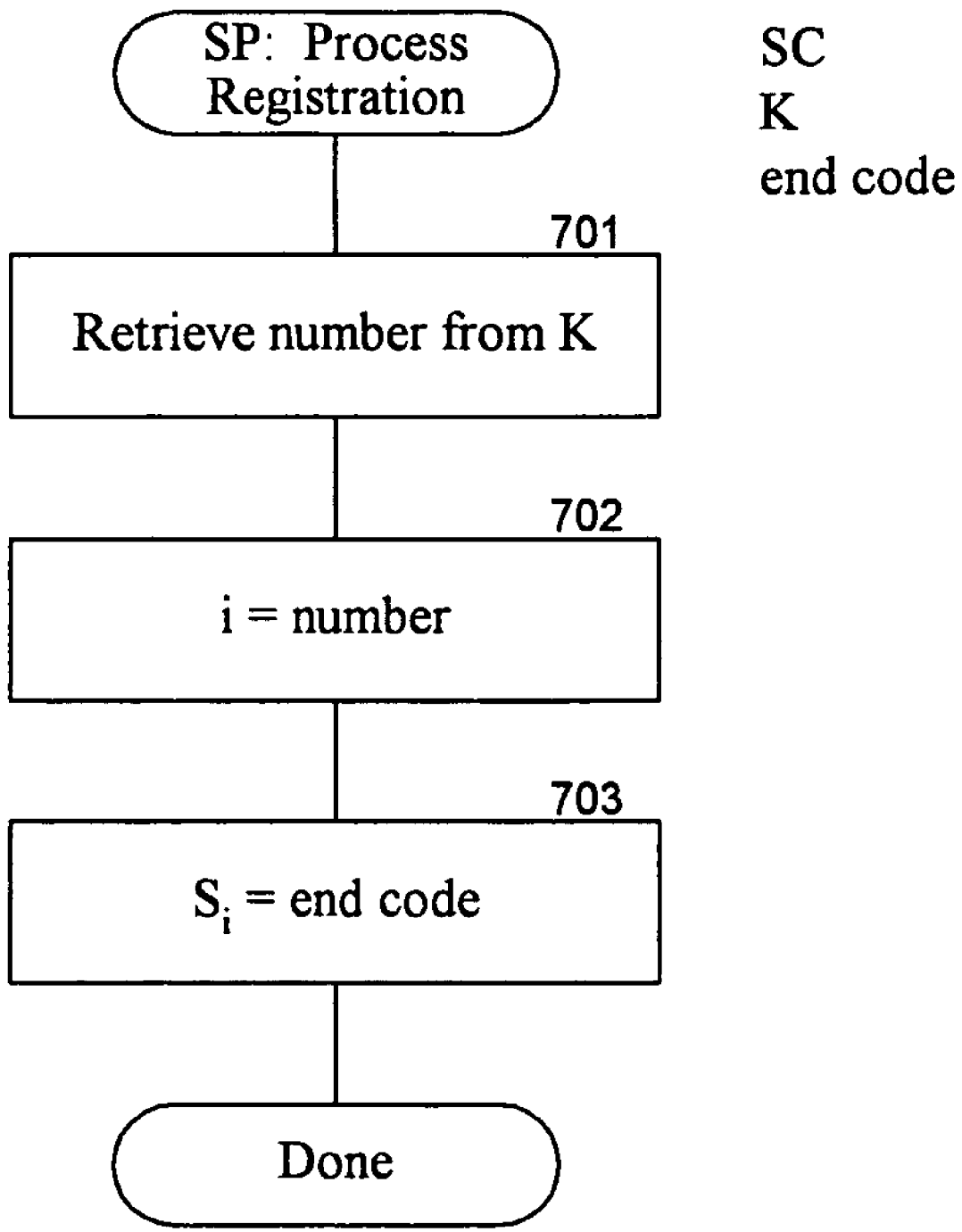
FIG. 7 is a flow diagram illustrating the processing of a component of the service provider that is invoked when a registration notification message is received from a service intermediary in one embodiment.

FIG. 7 is a flow diagram illustrating the processing of a component of the service provider that is invoked when a registration notification message is received from a service intermediary in one embodiment. The component is passed an indication of the service consumer, the contract, and the end code. The component may validate the service consumer and contract. If not valid, the component may send a not confirmed or reject response message to the service intermediary. In block 701, the component retrieves the number of services within a sequence from the contract. In block 702, the component sets a variable to track the number of services that have been requested by counting down from the initial number. In block 703, the component stores the end code in an array S and completes.

Figure 8:
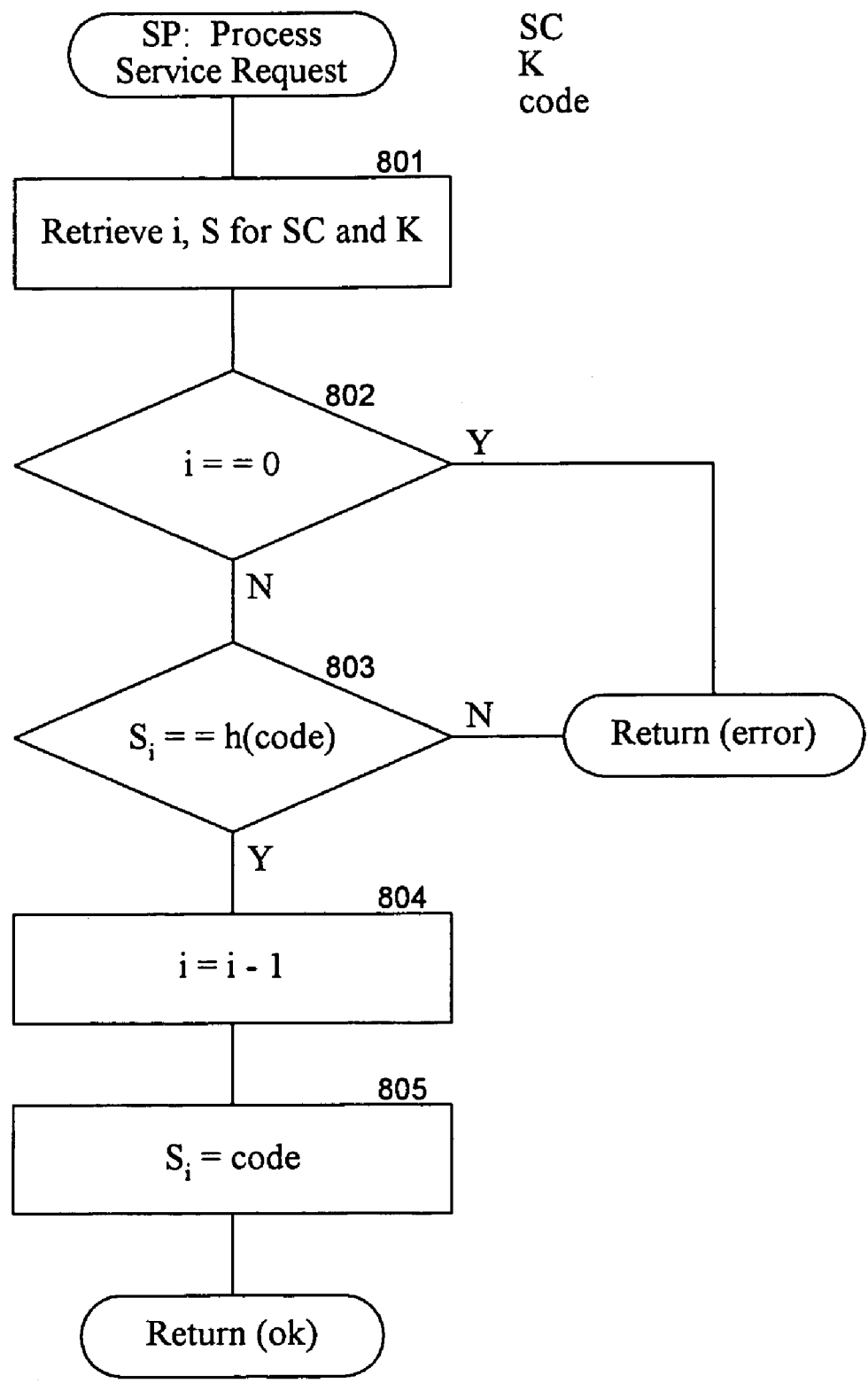
FIG. 8 is a flow diagram illustrating the processing of a component of a service provider that is invoked when a service request message is received from a service consumer in one embodiment.

FIG. 8 is a flow diagram illustrating the processing of a component of a service provider that is invoked when a service request message is received from a service consumer in one embodiment. The component is passed an indication of the service consumer, the contract, and a code. The component verifies that the code is correct and, if correct, performs the service. In block 801, the component retrieves an indication of the number of services remaining to be provided in the sequence for the service consumer and contract. In decision block 802, if no services are remaining to be provided, then the component returns an error, else the component continues at block 803. In decision block 803, if the application of the one-way function to the received code equals the last code received, then the component continues at block 804, else the component returns an indication of an error. In block 804, the component decrements a variable to track the number of services remaining to be provided. In block 805, the component stores the received code and then returns an indication that the passed code has been verified. The service provider need only save the last code provided for use as non-repudiatable evidence and to verify the correctness of the next code that is received.

Figure 9:
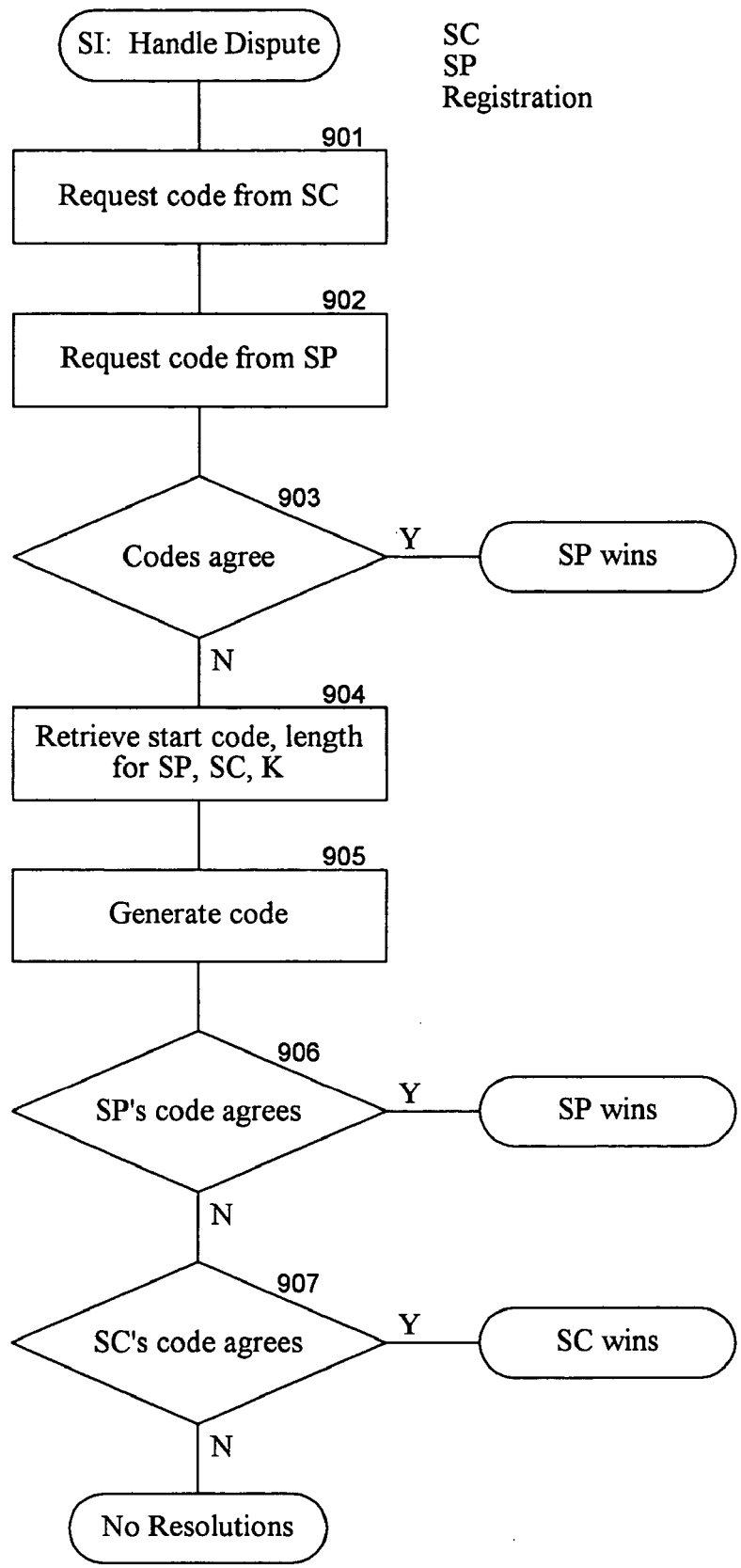
FIG. 9 is a flow diagram illustrating the processing of a component of the service intermediary that handles disputes in one embodiment.

FIG. 9 is a flow diagram illustrating the processing of a component of the service intermediary that handles disputes in one embodiment. This component is invoked when a service consumer disputes a charge from a service provider. This component handles dispute resolutions based only on the sequence of codes generated by the service consumer. The component is passed an indication of the service consumer, the service provider, and the registration of the sequence that is being disputed. In block 901, the component requests the appropriate code from the service consumer. The appropriate code represents the number of services for which the service consumer was charged. In block 902, the component requests the service provider to provide the appropriate code (i.e., its non-repudiatable evidence). In decision block 903, if the received codes agree, then the component declares the service provider as the winner, else the component continues at block 904. In block 904, the component retrieves the start code and number of services for that registration. In block 905, the component generates the codes of the sequence. In decision block 906, if the service provider's code agrees with the generated codes, then the component declares the service provider as the winner, else the component continues at block 907. In decision block 907, if the service consumer's code agrees with the generated codes, then the component declares the service consumer as the winner, else the component reports that the dispute cannot be resolved because neither the service consumer nor the service provider provided a code that supports the charged services.

In one embodiment, when both the service provider and service consumer generate code sequences, the service intermediary declares a winner only when a party provides both codes correctly. To resolve a dispute, the service intermediary asks both parties to provide the service provider and service consumer codes to support their position. If the codes provided by the service provider are correct, then the service intermediary declares the service provider as the winner. Otherwise, if the codes provided by the service consumer are both correct, the service intermediary declares the service consumer as the winner. In all other cases, both parties have provided at least one code that is incorrect, and the service intermediary declares that there is no winner.

Figure 10:
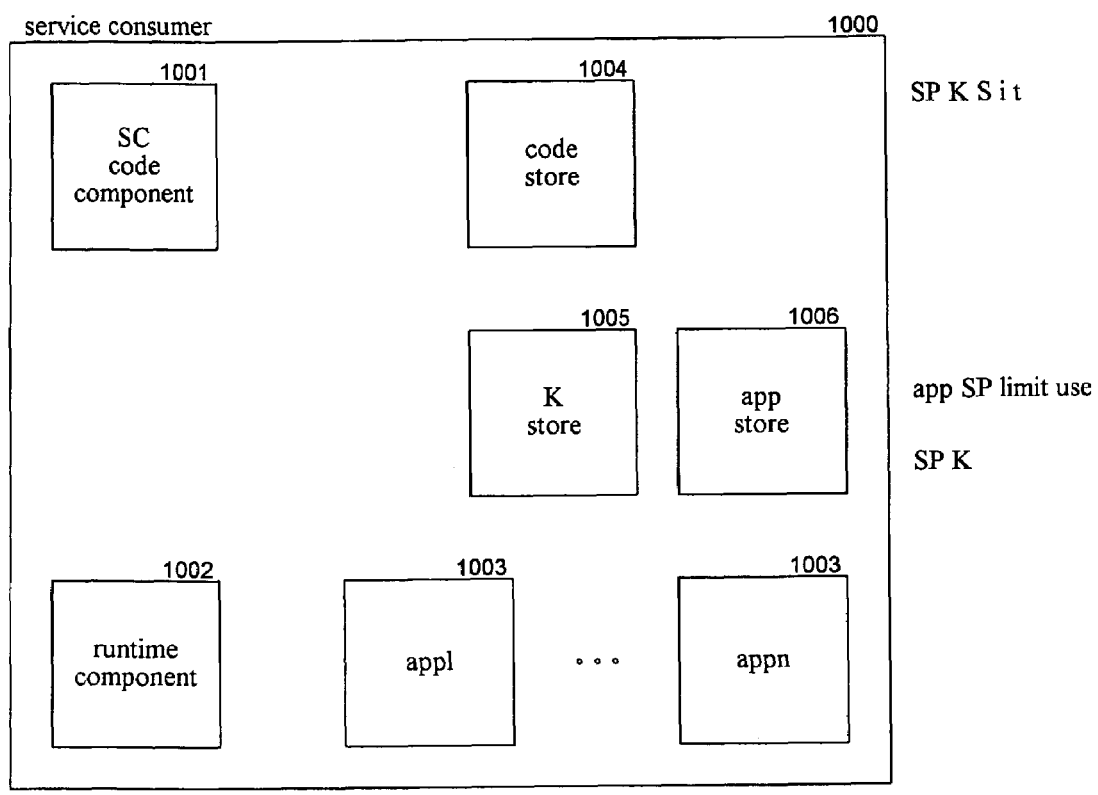
FIG. 10 is a block diagram illustrating components of the service consumer in one embodiment.

FIG. 10 is a block diagram illustrating components of the service consumer in one embodiment. The service consumer 1000 includes a service consumer code component 1001, a runtime component 1002, applications 1003, a code store 1004, a contract store 1005, and an application store 1006. The service consumer code component is responsible for generating sequences and registering the sequences with the service intermediary. The runtime component is responsible for providing an environment to the applications through which the applications can access the service providers. The runtime component ensures that an application that requests services in excess of its authorization is uninstalled and that a corresponding notification is sent to the service provider. The code store contains information relating to the registrations. Each entry identifies the service provider, contract, sequence, and current index into the sequence for each registered sequence. The contract store contains information describing the contracts of the service consumer. Each entry in the contract store identifies the service provider and the contract terms. The application store contains information describing the limits of services for each application. Each entry of the application store may identify the application, a service provider, the authorized limit, and the current usage of that service.

FIG. 11 is a display description illustrating how a user of the service consumer can establish the authorized limits for applications in one embodiment. The display description 1100 includes an application name 1101 and an authorization table 1102. The authorization table contains a column for the service provider, cumulative limit, authorized limit, and period. The service provider column identifies a service provider that the application is authorized to access. The cumulative limit specifies the total number of service requests to that service provider that has been authorized across all applications. The authorization limit indicates the number of service requests that the application is authorized to request of the service provider. For example, the first row of the table indicates that the application needs to use the location service provider, that the applications as a group have been authorized to request 500 services per month, and that this application is authorized to request up to 50 services per month. The information from this display screen is stored in the application store.

Figure 12:
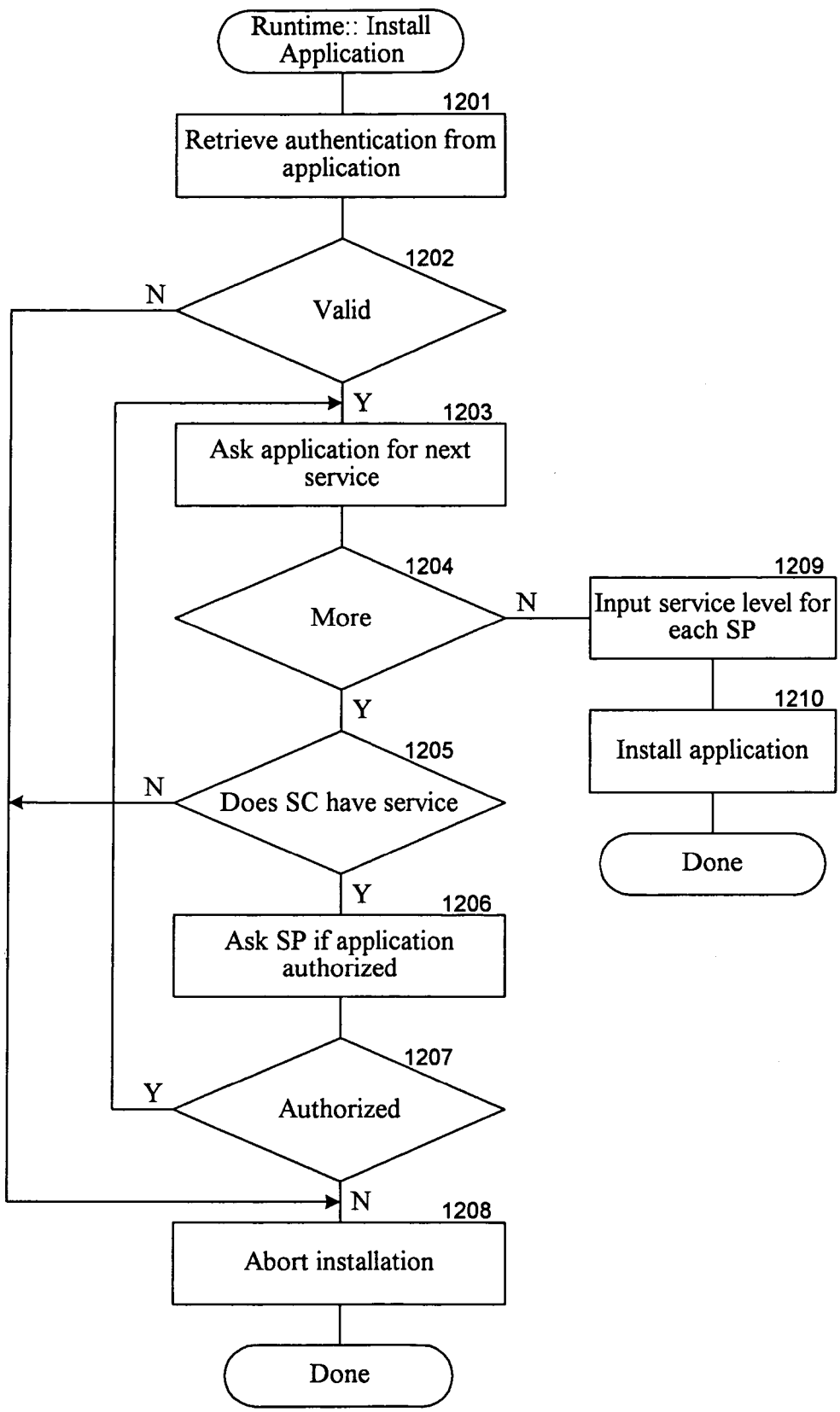
FIG. 12 is a flow diagram illustrating the processing of an installation subcomponent of the runtime component in one embodiment.

FIG. 12 is a flow diagram illustrating the processing of an installation subcomponent of the runtime component in one embodiment. In block 1201, the component retrieves authentication information from the application. The authentication information may be the application name that is encrypted using a private key of the application. The component can use the public key of the application to decrypt the name. In decision block 1202, if the component determines that the application is authentic (e.g., the name is correctly decrypted), then the component continues at block 1203, else the component continues at block 1208 to abort the installation and complete. In blocks 1203-1207, the component loops determining whether the service consumer has subscribed to the service providers needed by the application. In block 1203, the component asks the application for the next service provider that it needs. In decision block 1204, if the application indicates that it needs another service provider, then the component continues at block 1205, else the component continues at block 1209. In decision block 1205, if the service consumer has subscribed to that service provider, then the component continues at block 1206, else the service consumer cannot support that application, and it aborts the installation in block 1208 and then completes. In block 1206, the component asks the service provider if the application is authorized to use that service provider. In decision block 1207, if the application is authorized, then the component loops to block 1203 to ask the application for the next service provider that it needs, else the component aborts the installation in block 1208 and then completes. In block 1209, the service consumer can provide all the service providers needed by the application and the component inputs the service authorization limit for each service provider using the display description of FIG. 11. In block 1210, the component proceeds with installing the application and then completes.

Figure 13:
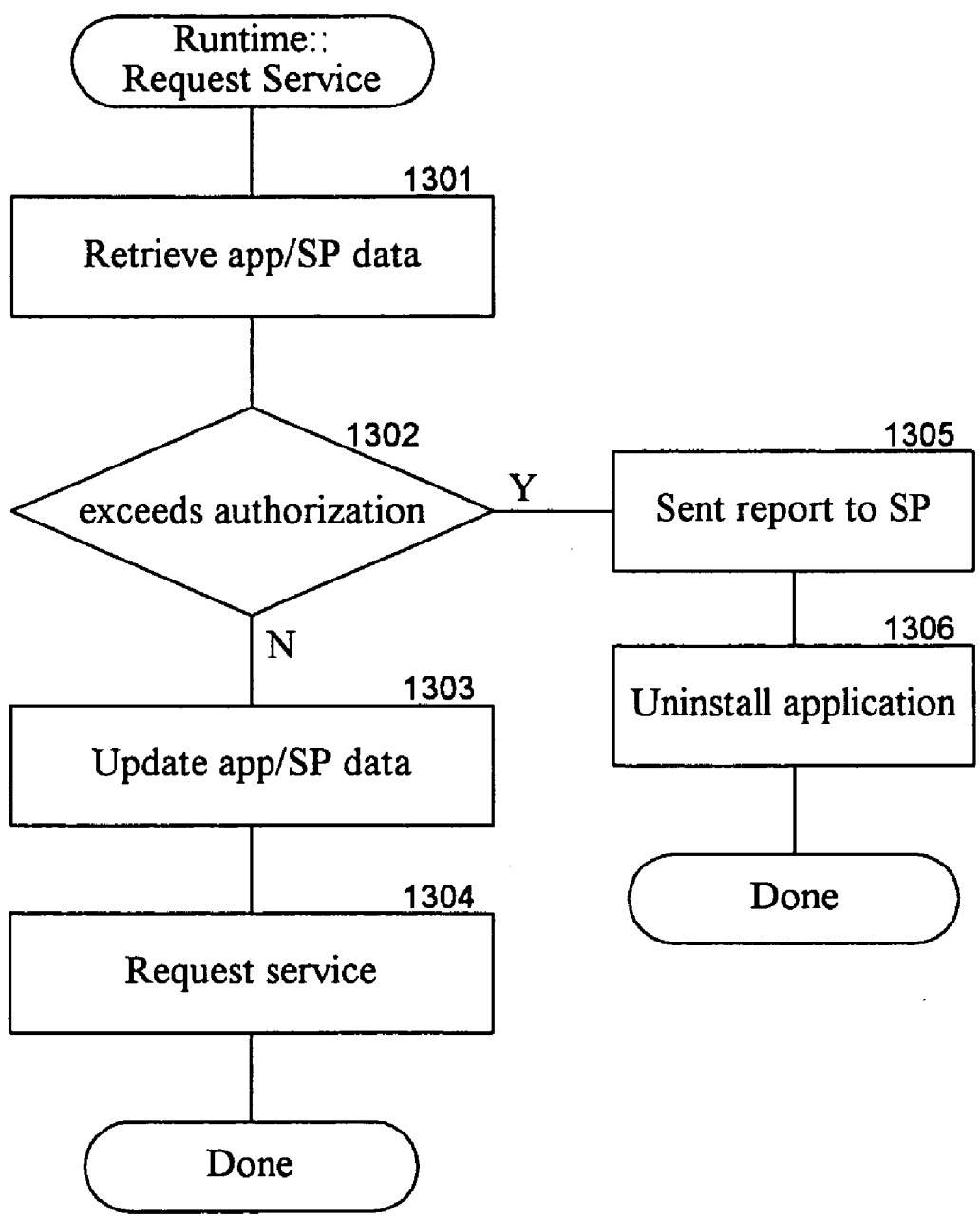
FIG. 13 is a flow diagram illustrating the processing of a subcomponent of the runtime component that requests the service provider to perform a service in one embodiment.

FIG. 13 is a flow diagram illustrating the processing of a subcomponent of the runtime component that requests the service provider to perform a service in one embodiment. In block 1301, the component retrieves application data from the application store. In decision block 1302, if the request of service would exceed the application's authorization limit for that service provider, then the component continues at block 1305, else the component continues at block 1303. In block 1303, the component updates the application data in the application store to indicate the increased usage of the service. In block 1304, the component then sends the request to the service provider including the next code in the sequence. The component then completes. In block 1305, the component sends a report to the service provider that the application is behaving incorrectly. In block 1306, the component uninstalls the application and then completes.

One skilled in the art will appreciate that many variations of the described techniques are possible. For example, a service consumer can generate a public and private key pair when it wants to request a sequence of services. The service consumer can register the public key with the service intermediary, which can provide the public key to the service provider. When the service consumer sends a service request it includes a sequence number encrypted with the private key. When the service provider receives the request, it can decrypt the sequence number using the public key and verify that it is correct. If so, the service provider can use the encrypted sequence number as the non-repudiatable evidence.

One skilled in the art will also appreciate that a service consumer could use a code generated by and provided by the service provider as non-repudiatable evidence that it requested and was provided with a certain number services. Such evidence may be useful when, for example, a service consumer receives a discount if it requests a minimum number of services.

One skilled in the art will also appreciate that a runtime environment can use many different techniques for determining whether an application is misbehaving. For example, the runtime environment could detect if an application is taking too long to perform a task (e.g., in an infinite loop), requesting services too frequently, and so on as indications of misbehavior. The runtime environment could also receive input as to whether a user is satisfied with the operation of the application. The runtime environment can report these misbehaviors to various service providers so that the service providers can aggregate reports from multiple service consumers to provide an accurate assessment of whether the application is misbehaving.

From the foregoing, it will be appreciated that specific embodiments of the invention have been described herein for purposes of illustration, but that various modifications may be made without deviating from the spirit and scope of the invention. One skilled in the art will appreciate that the term "service" includes any type of action that can be requested of a service provider. For example, the actions can include selling physical or electronic products to a user (e.g., a music CD), dispensing product at a vending machine, locating a telephone number, authorizing payment, controlling household lights remotely, streaming video, and so on. Accordingly, the invention is not limited except as by the appended claims.

We claim:

1. A method in a computing device with a processor and a memory for requesting a service provider to provide services so that the service provider can demonstrate to a service intermediary that it provided services requested by a service consumer, the method comprising:
   generating by the service consumer a start code and a sequence of codes starting with the start code and ending with an end code, each code being generated by applying a function to the previously generated code, the codes being generated in a forward order from the start code to the end code;
   registering with the service intermediary an indication of an end code of the service consumer and an identification of the service provider wherein the intermediary provides the end code to the service provider;
   when the service consumer requests the service provider to provide services, providing by the service consumer to the service provider the generated codes in reverse order of generation such that the service consumer only provides the next code in reverse order when a prior requested service has been provided by the service provider;
   when the service provider can verify that the end code can be derived from the code provided with a request, providing the requested service to the service consumer;
   providing by the service consumer to the service intermediary an indication of a consumer last code provided by the service consumer to the service provider;
   providing by the service provider to the service intermediary an indication of a provider last code provided by the service consumer to the service provider;
   when the service intermediary determines that the consumer last code and the provider last code are the same, indicating that evidence has been provided that the requested service was provided; and
   when the service intermediary determines that the consumer last code and the provider last code are not the same,
      applying the function to the provider last code to determine whether the end code can be generated;
      when the end code can be generated, indicating that the service provider has provided evidence that the requested service was provided and thus establishing that the consumer last code was not the actual last code provided to the service provider or establishing that the provider last code was not the actual last code provided to the service provider by the service consumer; and
      when the end code cannot be generated, indicating that the service provider has not provided evidence that the requested service was provided and thus establishing that the provider last code was not a code provided in a request to the service provider by the service consumer such that the service provider verified that the end code can be derived from the provider last code
   wherein the method is performed by the computing device.

2. The method of claim 1 wherein the indication of the end code is a start code from which the end code can be derived by the service intermediary.

3. The method of claim 1 wherein the registering include providing a start code and an end code.

4. The method of claim 1 wherein the service consumer requests the service provider to provide a service after the last requested service has been provided by the service provider.

5. The method of claim 1 wherein the service consumer can limit the number of outstanding requests for services to control exposure to liability for requested services that have not yet been provided.

6. The method of claim 1 wherein the service provider verifies that the end code can be derived from a provided code by comparing a previously provided code to the result of applying a function to the provided code.

7. The method of claim 1 wherein the sequence of codes has a length.

8. The method of claim 7 wherein the length is agreed upon by the service provider and the service consumer.

9. The method of claim 7 wherein the setting of the length of the sequence of codes can be used by the service provider to control exposure for liability for provided services for which payment has not yet been received.

10. The method of claim 7 wherein the service intermediary provides the length to the service provider.

11. The method of claim 1 wherein the service provider registers with the service intermediary an indication of an end code of the service provider and provides the service consumer with a code from which the end code of the service provider can be derived when a service is provided.

12. The method of claim 11 wherein a code provided by the service provider to the service consumer can be used in determining whether the service consumer requested services.

13. A computer-readable storage device storing instructions for controlling a computer system of a service consumer to request a service provider to provide services so that the service provider can demonstrate to a service intermediary that it provided services requested by the service consumer, by a method comprising:
   generating by the service consumer a start code and a sequence of codes starting with the start code and ending with an end code, each code being generated by applying a function to the previously generated code, the codes being generated in a forward order from the start code to the end code;
   registering with the service intermediary an indication of an end code of the service consumer and an identification of the service provider wherein the intermediary provides the end code to the service provider;
   when the service consumer requests the service provider to provide services, providing by the service consumer to the service provider the generated codes in reverse order of generation such that the service consumer only provides the next code in reverse order when a prior requested service has been provided by the service provider;

when the service provider can verify that the end code can be derived from the code provided with a request, receiving by the service consumer an indication that the requested service has been provided by the service provider;

providing by the service consumer to the service intermediary an indication of a consumer last code provided by the service consumer to the service provider, wherein the service provider also provides to the service intermediary an indication of a provider last code provided by the service consumer to the service provider;

when the service intermediary determines that the consumer last code and the provider last code are the same, receiving an indication that evidence has been provided that the requested service was provided; and when the service intermediary determines that the consumer last code and the provider last code are not the same, receiving from the service intermediary an indication of whether the service provider has provided evidence that the requested service was provided, the service intermediary determining whether the evidence was sufficient by:

applying the function to the provider last code to determine whether the end code can be generated;

when the end code can be generated, indicating that the service provider has provided evidence that the requested service was provided and thus establishing that the consumer last code was not the actual last code provided to the service provider or establishing that the provider last code was not the actual last code provided to the service provider by the service consumer; and when the end code cannot be generated, indicating that the service provider has not provided evidence that the requested service was provided and thus establishing that the provider last code was not a code provided in a request to the service provider by the service consumer such that the service provider verified that the end code can be derived from the provider last code.

14. The computer-readable storage device of claim 13 wherein the indication of the end code is a start code from which the end code can be derived by the service intermediary.

15. The computer-readable storage device of claim 13 wherein the registering include providing a start code and an end code.

* * * * *

UNITED STATES PATENT AND TRADEMARK OFFICE
CERTIFICATE OF CORRECTION

PATENT NO. : 7,577,990 B2
APPLICATION NO. : 10/789808
DATED : August 18, 2009
INVENTOR(S) : Smith et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1040 days.

Signed and Sealed this

Seventh Day of September, 2010

David J. Kappos
*Director of the United States Patent and Trademark Office*